United States Patent [19]

Sumimoto

[11] Patent Number: 4,650,209
[45] Date of Patent: Mar. 17, 1987

[54] VEHICLE REAR SUSPENSION SYSTEM
[75] Inventor: Takashi Sumimoto, Hiroshima, Japan
[73] Assignee: Mazda Motor Corporation, Hiroshima, Japan
[21] Appl. No.: 832,654
[22] Filed: Feb. 25, 1986
[30] Foreign Application Priority Data Feb. 26, 1985 [JP] Japan .................................. 60-37295
Feb. 26, 1985 [JP] Japan .................................. 60-37296
Feb. 26, 1985 [JP] Japan .................................. 60-37297
Mar. 5, 1985 [JP] Japan ............................. 60-31247[U]

[51] Int. Cl.$^4$ ................................................ B60G 3/00
[52] U.S. Cl. ..................................... 280/690; 280/701
[58] Field of Search ................ 280/690, 698, 700, 701
[56] References Cited

U.S. PATENT DOCUMENTS

| 4,269,432 | 5/1981 | Inoue et al. | 280/690 |
| 4,440,419 | 4/1984 | Kosak et al. | 280/661 |
| 4,471,974 | 9/1984 | Kosak et al. | 280/690 |

FOREIGN PATENT DOCUMENTS 2038880 2/1972 Fed. Rep. of Germany .
56-62205 5/1981 Japan .

Primary Examiner—John A. Pekar
Attorney, Agent, or Firm—Fleit, Jacobson, Cohn & Price

[57] ABSTRACT

A vehicle rear suspension system having a substantially longitudinally extending swing arm and three lateral links. The swing arm is attached at the front end through a rubber bush to the vehicle frame and connected at the rear end rigidly to a wheel hub carrier. The lateral links are connected at the outer ends to the wheel hub carrier through ball joints and at the inner ends to the vehicle body through rubber bushes. The rubber bushes for connecting the lateral links to the vehicle body have axes which are located such that, in a projection to a longitudinally vertical plane, the axes are directed toward the center of swinging movement of the swing arm.

10 Claims, 7 Drawing Figures

VEHICLE REAR SUSPENSION SYSTEM

CROSS-REFERENCE TO THE RELATED APPLICATION

This application is related to the copending patent application Ser. No. 646,070 filed on Aug. 31, 1984.

BACKGROUND OF THE INVENTION

Field of the Invention

The present invention relates to a vehicle suspension system and more particularly to a rear suspension system of a motor vehicle.

Conventional independent type vehicle rear suspension systems include a so-called trailing arm type and a semi-trailing arm type. These types of suspension systems include a trailing arm extending in a longitudinal direction of the vehicle body and having a front end attached to the vehicle body for vertical swinging movements, the trailing arm being secured at the rear end to a hub carrier which carries a rear wheel hub. A substantially vertically extending damping strut is provided between the rear end portion of the trailing arm and the vehicle body. The suspension systems of these types are advantageous in that they are simple in structure so that the overall weight can be decreased. There has however been recognized that the suspension systems of these types require trailing arm of substantial cross-sectional area in order to ensure an adequate lateral rigidity. Further, the front end of the trailing arm must be attached to the vehicle body at laterally spaced positions. As the results, the trailing arm must be of a substantial dimension and therefore of an increased weight.

In order to solve the above problems, Japanese laid-open utility model No. 56-62205 proposes, in a vehicle rear suspension system including a trailing arm having a front end mounted on a vehicle body for vertical swinging movements and a rear end carrying a wheel hub, to provide a pair of vertically spaced lateral links which are pivotally connected at the laterally outward ends to the rear end portions of the trailing arm and at the laterally inward ends to the vehicle body. This type of suspension system is advantageous in that the lateral links supports the trailing arm in the lateral direction so that the trailing arm may not be required to possess by itself a substantial lateral rigidity. It should however be noted that in this arrangement there are produced toe-out movements in the wheel when the wheel is bumped upwards with respect to the vehicle body and when the wheel is rebounced downwards with respect to the vehicle body. Such toe-out movements cause a tendency of over-steer in a curved path so that there will be a danger of steering instability.

In the Japanese laid-open patent application No. 60-53408 published on Mar. 27, 1985 and corresponding to the U.S. application Ser. No. 646,070, there is proposed a vehicle rear suspension system which includes a substantially longitudinally extending swing arm having one end pivotably connected with the vehicle body for vertical swinging movements and the other end connected with the wheel hub carrier, and three lateral links extending in substantially lateral directions. The lateral links are pivotably connected at one ends with the vehicle body and at the other ends with the wheel hub carrier at locations which are not aligned on a single straight line. According to the proposed, the three lateral links function to determine the position of the wheel. Therefore, it is possible to prevent or suppress the toe-out displacements in the hump and rebouncing movements of the wheel by properly determining the positions, the lengths and the orientations of the lateral links. It is also possible to control the camber angle of the wheel in a desirable manner.

In the proposed structure, it is advisable to make the swing arm such that it does not disturb the movements of the lateral links. Thus, the swing arm is preferably of a structure having a small rigidity in lateral direction. For example, it may have a very small lateral thickness with a relatively large heigthwise dimension so that it can be easily deflected in the lateral direction. Alternatively or furthermore, the swing arm may be attached to the vehicle body through resilient means such as a rubber bush. It should however be noted that even though the swing arm is constructed to have a small rigidity in lateral directions and mounted on the vehicle body through a resilient rubber bush, the swing arm can still cause a restriction against the swinging movements of the lateral links due to the geometrical arrangements. Since the swing arm conducts swinging movements about the axis of pivotably attachment with the vehicle body, the wheel hub carrier is moved along an arcuate path having the center of arc at the axis of the pivotable attachment in response to the swinging movements of the swing arm. Thus, the lateral links are required to have freedoms not only for vertical swinging movements but also for certain fore-and-aft swinging movements. It should however be noted that it is not easy to obtain a structure which can permit such movements of the lateral links.

Conventional measures for solving the problems are to mount the laterally inner ends of the lateral links through rubber bushes which can allow the fore-and-aft swinging movements of the lateral links. However, such structure is not satisfactory in that the rubber bushes are subjected to substantial torsional and compressive loads which cause complicated deformations of the rubber bushes. As the results, swinging movements of the lateral links are disturbed and the durability of the rubber bushes is adversely affected.

SUMMARY OF THE INVENTION

It is therefore an object of the present invention to provide a vehicle rear suspension system having a substantially longitudinally extending swing arm and three substantially laterally extending links, in which smooth swinging movements of the lateral links can be ensured.

Another object of the present invention is to provide a vehicle rear suspension system having a substantially longitudinally extending swing arm and three substantially laterally extending links, in which fore-and-aft swinging movements of the lateral links can be minimized.

Still further object of the present invention is to provide a vehicle rear suspension system in which deformations of the resilient means for mounting the lateral links to the vehicle body can be significantly decreased and therefore the durability of the resilient means can be increased.

According to the present invention, the above and other objects can be accomplished by mounting the three lateral links for vertical swinging movements about swinging axes which are directed in projections on a longitudinally vertical plane toward the center of the swinging movement of the swing arm. Thus, the present invention provides a vehicle rear suspension system comprising swing arm means extending substantially longitudinally and having one end connected to a vehicle body for vertical swinging movements substantially about a center of movement, said one end of the swing arm means being resiliently connected to the vehicle body, wheel carrying means for carrying a rear wheel for rotation about a rotation axis, said wheel carrying means being connected rigidly with said swing arm means at the other end of the swing arm means so that a longitudinal force and a rotating force about a transverse axis extending in a lateral direction of the vehicle body can be transmitted between the swing arm means and the wheel carrying means, first, second and third lateral links extending in substantially lateral direction of the vehicle body, each of said lateral links having one end pivotably connected through a single pivot means with said wheel carrying means and the other end pivotably connected through a single pivot means having a pivot axis with the vehicle body, said one ends of the first, second and third lateral links being connected to said wheel carrying means at locations which are not aligned on a single straight line, characterized by the fact that, in a projection to a longitudinally vertical plane, the pivot axis of the pivot means for connecting each of said lateral links to said vehicle body is directed toward the center of the movement of the swing arm means.

According to a preferable aspect of the present invention, there is provided a sub-frame which has a substantially longitudinally extending section which is attached to the vehicle body at front and rear end portions, the rear end portion being located higher than the front end portion, said one end of the swing arm means being attached to the sub-frame at a heightwise position between the front and rear end portions of the longitudinally extending section of the sub-frame. This arrangement is advantageous in that the longitudinal load transmitted through the swing arm is shared by the front and rear end portions of the sub-frame section so that it is possible to avoid concentration of the longitudinal load to one of the end portions of the sub-frame section.

According to a further aspect of the present invention, the swing arm means is attached to the vehicle body through resilient bush means which is mounted on the vehicle body such that an axial sliding movement of the bush means is permitted.

The above and other objects and features of the present invention will become apparent from the following descriptions of preferred embodiments taking reference to the accompanying drawings.

DESCRIPTION OF THE PREFERRED EMBODIMENTS

Figure 1:
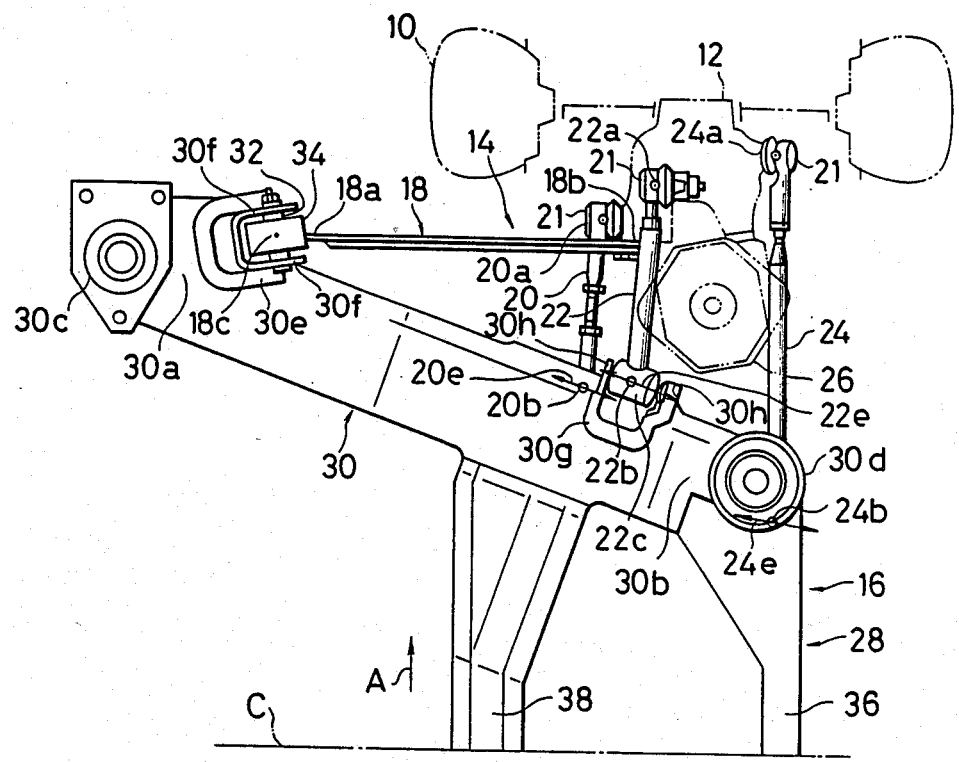
FIG. 1 is a top plan view of a vehicle rear suspension system in accordance with one embodiment of the present invention.
Figure 2:
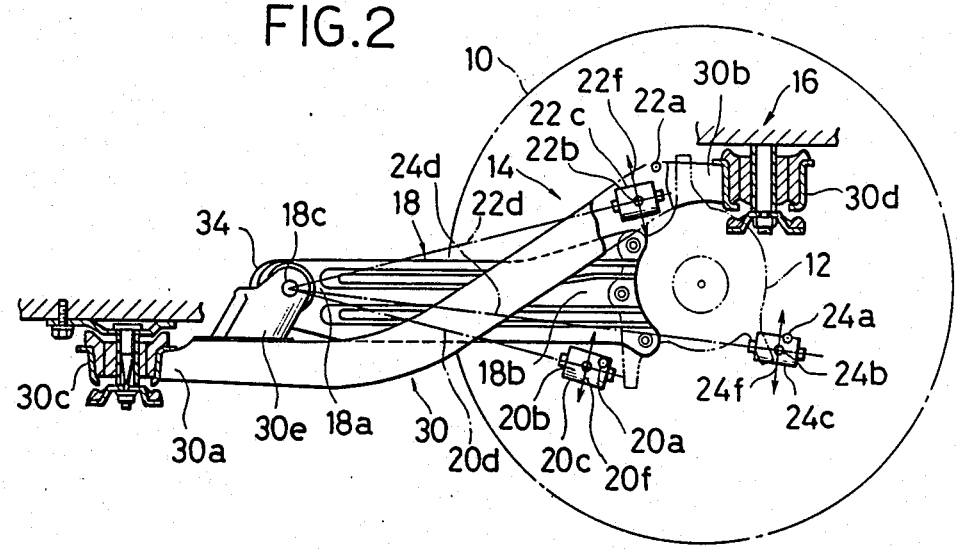
FIG. 2 is a side view of the suspension system shown in FIG. 1.

Referring to the drawings, particularly to FIGS. 1 and 2, there is shown a vehicle rear suspension system 14 for connecting a rear wheel 10 rotatably carried by a wheel carrier 12 with a vehicle body 16. The suspension system 14 includes a substantially longitudinally extending swing arm 18, a first lateral link 20, a second lateral link 22 and a third lateral link 24. The swing arm 18 is constituted by a plate member having a substantial heightwise dimension and a relatively small thickness.

Figure 7:
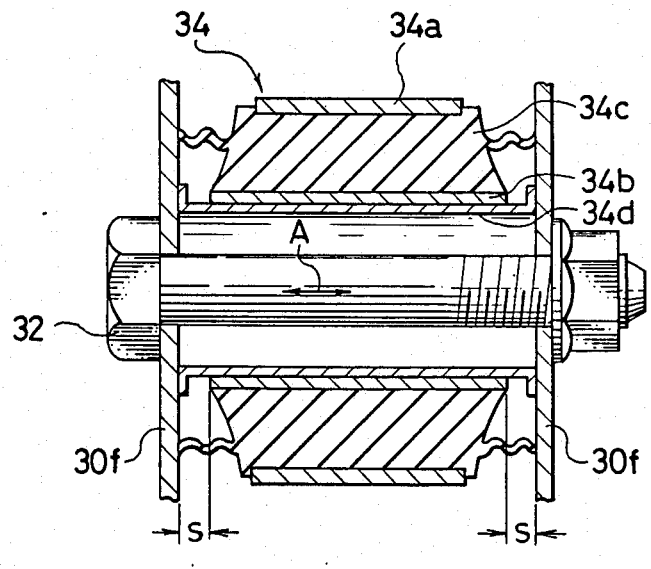
FIG. 7 is a sectional view of one example of the rubber bush for attaching the swing arm to the vehicle body.

The vehicle body 16 includes a sub-frame 28 which has a substantially longitudinally extending section 30 and a pair of cross-members 36 and 38 which connects the longitudinal section 30 to the corresponding longitudinal section 30 at the other side of the vehicle body 16. The section 30 of the sub-frame 28 has a front end portion 30a and a rear end portion 30b mounted on the vehicle body 16 respectively through rubber mounts 30c and 30d. The swing arm 18 is attached at the front end portion 18a through a rubber bush 34 and a mounting bolt 32 to the section 30 of the sub-frame 28 for swingable movement about the axis of the bolt 32. The rubber bush 34 may be of a structure as shown in FIG. 7 and include an outer tube 34a secured to the front end portion 18a of the swing arm 18, an inner tube 34b and a cylindrical rubber member 34c attached at the outer and inner peripheries to the outer tube 34a and the inner tube 34b, respectively.

Referring to FIG. 2, it will be noted that the longitudinal section 30 of the sub-frame 28 is curved upward from the front end portion 30a toward the rear end portion 30b so that the rear end portion 30b is mounted on the vehicle body 16 at a position higher than the position where the front end portion 30a is mounted on the vehicle body 16. At the front end portion 30a, the section 30 is provided with a bracket 30e which projects upward from the upper surface of the section 30. Referring to FIG. 7, it will be noted that the bracket 30e has a pair of mounting flanges 30f. The rubber bush 34 has a spacer tube 34d on which the inner tube 34b is axially slidably mounted. The spacer tube 34d is placed between the mounting flanges 30f and the mounting bolt 32 is inserted through the flanges 30f and the spacer tube 34d. The swing arm 18 is securely connected at the rear end portion 18b to the wheel carrier 12. It will be understood that, with this arrangement, the front end portion 18a of the swing arm 18 is attached to the sub-frame 28 at a heightwise position between the front end portion 30a and the rear end portion 30b of the section 30 so that the longitudinal load transmitted through the swing arm 18 is shared by the rubber mounts 30c and 30d.

The lateral links 20, 22 and 24 extend substantially laterally with respect to the vehicle body 16. The lateral links 20, 22 and 24 have laterally outer ends 20a, 22a and 24a, respectively, which are connected with the wheel carrier 12 at spaced apart positions by means of ball joints 21. The positions of connections of the outer ends 20a, 22a and 24a to the wheel carrier 12 are such that lateral projections of these positions on a longitudinally vertical plane are not aligned on a straight line.

Figure 3:
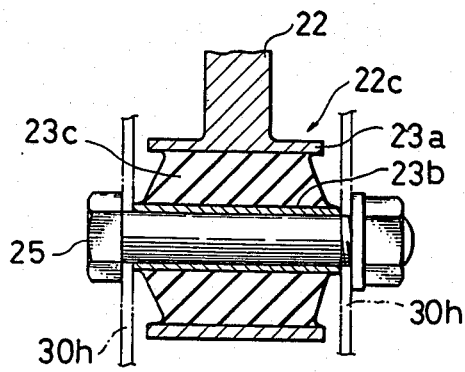
FIG. 3 is a sectional view of a rubber bush for mounting the lateral link on the vehicle body.

The lateral links 20, 22 and 24 further have laterally inner ends 20b, 22b and 24b, respectively, which are attached to the longitudinal section 30 of the sub-frame 28 by means of rubber bushes 20c, 22c and 24c. FIG. 3 shows one example of the rubber bush 22c. As shown, the bush 22c includes an outer tube 23a secured to the lateral link 22, an inner tube 23b and a cylindrical rubber member 23c secured at the outer and inner peripheral surfaces to the outer tube 23a and the inner tube 23b, respectively. The sub-frame section 30 is provided with a mounting bracket 30g having a pair of mounting flanges 30h. The inner tube 23b of the rubber bush 22c is held between the flanges 30h of the mounting bracket 30g and a mounting bolt 25 is inserted through the flanges 30h and the inner tube 23b. The rubber bushes 20c and 24c for the other lateral links 22 and 24 have similar structures.

Referring to FIG. 2, it will be noted that the rubber bush 22c for the lateral link 22 is arranged such that its axis as defined by the axis of the mounting bolt 25 is directed in a projection to a longitudinally vertical plane toward the center 18c of the swinging movement of the swing arm 18 as shown by a line 22d. Similarly, the projections of the axes of the rubber bushes 20c and 24c are also directed toward the center 18c of swinging movement of the swing arm 18 as shown by lines 20d and 24d, respectively. In a projection to a horizontal plane, the axes of the rubber bushes 20c, 22c and 24c are directed as shown by arrows 20e, 22e and 24e in FIG. 1.

The suspension system 14 further includes shock absorber 26 which extends substantially vertically. The shock absorber 26 may be of a known structure including a damping strut and a coil spring. The shock absorber 26 has a lower end attached to the wheel carrier 12 for swinging movement about a laterally extending horizontal axis and an upper end pivotably attached to the vehicle body.

In the arrangement described above, the lateral lines 20, 22 and 24 can swing very smoothly in the directions shown by arrows 20f, 22f and 24f. Further, the directions shown by the arrows 20f, 22f and 24f are substantially in conformity with the direction of the swinging movement of the swing arm 18. It will therefore be understood that the lateral links 20, 22 and 24 can swing about the axes of the rubber bushes 20c, 22c and 24c without receiving substantial constraint from the swing arm 18. It is therefore possible to prevent undesirable deformation of the rubber bushes.

Figure 4:
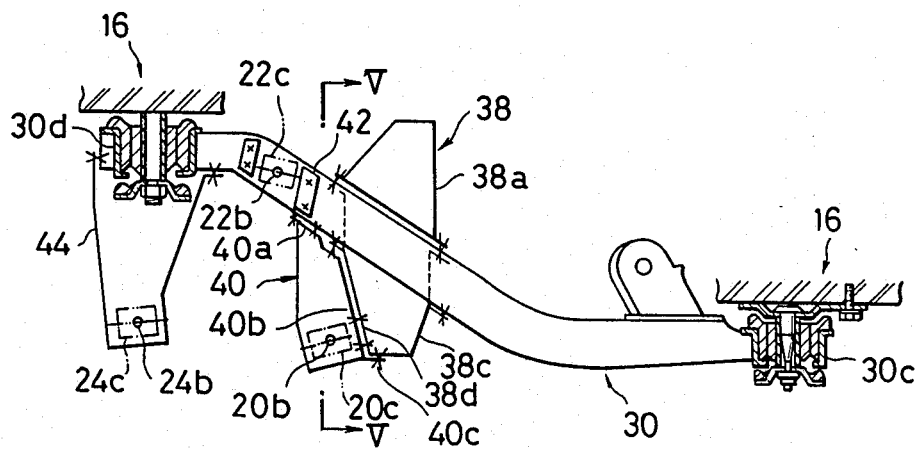
FIG. 4 is a top plan view of the suspension system shown in FIG. 3.
Figure 5:
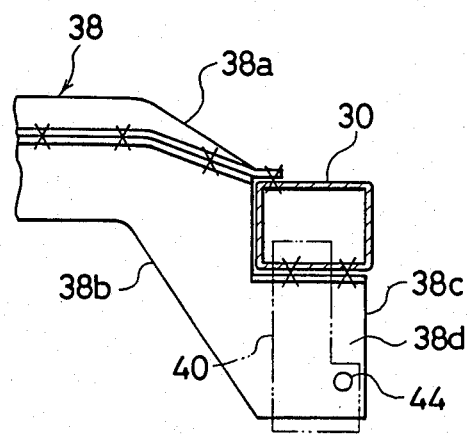
FIG. 5 is a sectional view taken along the line V—V in FIG. 4.
Figure 6:
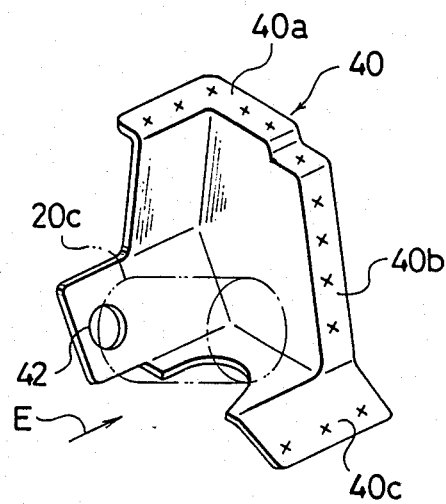
FIG. 6 is a perspective view of a bracket used in the suspension system shown in FIGS. 3 and 4.

Referring to FIGS. 4 through 6, there is shown an alternate example of the connection between the inner end portion 20b and the sub-frame section 30. As described with reference to the previous embodiment, the sub-frame 28 includes cross-members 36 and 38 connecting together the longitudinal sections 30. As shown in FIG. 5, the cross-member 38 comprises an upper panel 38a and a lower panel 38b which are welded together at their peripheries to form a structure of closed cross-section. At the end portion, the upper panel 38a is welded to the upper surface of the longitudinal section 30. The lower panel 38b has a downwardly bulged extension 38c which is located beneath the section 30 and welded to the lower side of the longitudinal section 30. On the longitudinal section 30, there is provided a mounting bracket 40 for mounting the inner end portion 20b of the lateral link 20. As shown in FIG. 6, the bracket 40 has an upper flange 40a which is welded to the lower side of the section 30, a front flange 40b welded to a rear side wall 38d of the extension 38c in the cross-member 38 and a lower flange 40c welded to the lower side of the extension 38c. The rubber bush 20c for mounting the lateral link 20 is placed in the bracket 40 as shown in FIG. 6. The bracket 40 has a bolt hole 42 and the rear side wall 38d of the cross-member 38 is formed with a bolt hole 44 which is aligned with the bolt hole 42. A bolt (not shown) for mounting the rubber bush 20c is passed through the bolt holes 42 and 44. This arrangement provides a rigid structure for supporting the rubber bush 20c.

The invention has thus been shown and described with reference to specific embodiments, however, it should be noted that the invention is in no way limited to the details of the illustrated structures but changes and modifications may be made without departing from the scope of the appended claims.

I claim:

1. A vehicle rear suspension system comprising swing arm means extending substantially longitudinally and having one end connected to a vehicle body for vertical swinging movements substantially about a center of movement, said one end of the swing arm means being resiliently connected to the vehicle body, wheel carrying means for carrying a rear wheel for rotation about a rotation axis, said wheel carrying means being connected rigidly with said swing arm means at the other end of the swing arm means so that a longitudinal force and a rotating force about a transverse axis extending in a lateral direction of the vehicle body can be transmitted between the swing arm means and the wheel carrying means, first, second and third lateral links extending in substantially lateral direction of the vehicle body, each of said lateral links having one end pivotably connected through a single pivot means with said wheel carrying means and the other end pivotably connected through a single pivot means having a pivot axis with the vehicle body, said one ends of the first, second and third lateral links being connected to said wheel carrying means at locations which are not aligned on a single straight line, characterized by the fact that, in a projection to a longitudinally vertical plane, the pivot axis of the pivot means for connecting each of said lateral links to said vehicle body is directed toward the center of the movement of the swing arm means.

2. A vehicle rear suspension system in accordance with claim 1 in which said other end of the each lateral link is connected with the vehicle body through a rubber bush having cylindrical rubber member which has an axis aligned with said pivot axis.

3. A vehicle rear suspension system in accordance with claim 1 in which said one end of each lateral link is connected with the wheel carrying means through a ball joint.

4. A vehicle rear suspension system in accordance with claim 1 in which said one end of the swing arm means is connected to the vehicle body through a rubber bush having a rubber member which is movable along an axis substantially aligned with an axis of the swinging movement of the swing arm means.

5. A vehicle rear suspension system in accordance with claim 4 which said rubber bush includes an outer tube, an inner tube arranged coaxially with respect to the outer tube, a cylindrical rubber member having an outer and inner peripheral surfaces which are secured to said outer and inner tubes, respectively, and a spacer tube supporting the inner tube for axial slidable movements, said rubber bush being mounted by a bolt which is inserted through the spacer tube.

6. A vehicle rear suspension system in accordance with claim 1 which further includes a sub-frame which has a substantially longitudinally extending section which is attached to the vehicle body at front and rear end portions, the rear end portion being located higher than the front end portion, said one end of the swing arm means being attached to the sub-frame at a heightwise position between the front and rear end portions of the longitudinally extending section of the sub-frame.

7. A vehicle rear suspension system in accordance with claim 1 in which said vehicle body includes sub-frame comprising a longitudinal member provided at each side of the vehicle body, and at least one cross-member connecting together the longitudinal members at the opposite sides of the vehicle body, at least one of said lateral links having said other end vertically offset with respect to the longitudinal member and located close to said cross-member, said other end of said one lateral link being mounted on the longitudinal member of the sub-frame through mounting bracket means which is attached to both the longitudinal member and the cross-member.

8. A rear suspension system for a vehicle having a rear body section provided with a sub-frame including a pair of longitudinal member extending substantially longitudinally at the opposite sides of the rear body section, and at least one cross-member extending substantially transversely and having opposite ends connected with the longitudinal members, said longitudinal member having a rear end portion located higher than a front end portion, said rear suspension system including swing arm means extending substantially longitudinally and having one end resiliently connected with said longitudinal member at a heightwise position between the front end portion and the rear end portion of the longitudinal member for vertical swinging movement about a center of movement, wheel carrying means for carrying a rear wheel for rotation about a rotation axis, said wheel carrying means being connected rigidly with said swing arm means at the other end of the swing arm means to that a longitudinal force and a rotating force about a transverse axis can be transmitted between the swing arm means and the wheel carrying means, first, second and third lateral links extending in substantially lateral directions, each of said lateral links having one end pivotably connected through a single pivot means with said wheel carrying means and the other end pivotably connected through a single pivot means having a pivot axis with said longitudinal member, at least one of said lateral links having said other end vertically offset with respect to the longitudinal member and located close to the cross-member, said other end of said one lateral link being mounted on the longitudinal member through mounting bracket means which is attached to both the longitudinal member and the cross-member, said one ends of the first, second and third lateral links being connected to said wheel carrying means at locations which are not aligned on a single straight line, the pivot axis of the pivot means for connecting each of said lateral links to said longitudinal member being directed in a projection to a longitudinally vertical plane toward the center of movement of the swing arm means.

9. A rear suspension system in accordance with claim 8 in which said sub-frame is mounted on the rear body section at the front and rear end portions of the longitudinal member through resilient mounting means.

10. A vehicle rear suspension system for a vehicle having a rear body section including at each side a longitudinal member extending substantially longitudinally and having a rear end portion located higher than a front end portion, said rear suspension system including swing arm means extending substantially longitudinally and having one end resiliently connected with said longitudinal member at a heightwise position between the front end portion and the rear end portion of the longitudinal member for vertical swinging movement about a center of movement, wheel carrying means for carrying a rear wheel for rotation about a rotation axis, said wheel carrying means being connected rigidly with said swing arm means at the other end of the swing arm means so that a longitudinal force and a rotating force about a transverse axis can be transmitted between the swing arm means and the wheel carrying means, first second and third lateral links extending in substantially lateral directions, each of said lateral links having one end pivotably connected through a single pivot means with said wheel carrying means and the other end pivotably connected through a single pivot means having a pivot axis with said longitudinal member, said one ends of the first, second and third lateral links being connected to said wheel carrying means at locations which are not aligned on a single straight line.

* * * * *